United States Patent
Zucchelli

(10) Patent No.: US 10,240,028 B2
(45) Date of Patent: Mar. 26, 2019

(54) HALOGEN-FREE FLAME RETARDANT POLYAMIDES COMPOSITION

(75) Inventor: Ugo Zucchelli, Benigno (IT)

(73) Assignee: ITALMATCH CHEMICALS S.p.A., Genoa (IT)

( * ) Notice: Subject to any disclaimer, the term of this patent is extended or adjusted under 35 U.S.C. 154(b) by 0 days.

(21) Appl. No.: 14/348,188

(22) PCT Filed: Sep. 28, 2011

(86) PCT No.: PCT/IB2011/002263
§ 371 (c)(1),
(2), (4) Date: Jul. 29, 2014

(87) PCT Pub. No.: WO2013/045966
PCT Pub. Date: Apr. 4, 2013

(65) Prior Publication Data
US 2015/0005416 A1    Jan. 1, 2015

(51) Int. Cl.
*C08K 3/32* (2006.01)
*C08K 5/00* (2006.01)
*C08K 5/13* (2006.01)
*C08K 5/053* (2006.01)
*C08L 77/00* (2006.01)
*C08K 5/3492* (2006.01)
*C08K 3/016* (2018.01)
*C08K 5/51* (2006.01)

(52) U.S. Cl.
CPC .......... *C08K 5/34924* (2013.01); *C08K 3/016* (2018.01); *C08K 3/32* (2013.01); *C08K 5/0066* (2013.01); *C08K 5/053* (2013.01); *C08K 5/13* (2013.01); *C08K 5/3492* (2013.01); *C08K 5/34922* (2013.01); *C08K 5/51* (2013.01); *C08K 2003/329* (2013.01)

(58) Field of Classification Search
CPC .......... C08L 77/00; C08K 5/053; C08K 3/032
See application file for complete search history.

(56) References Cited

U.S. PATENT DOCUMENTS

| 6,503,969 B1 * | 1/2003 | Klatt | C08K 5/5313 524/126 |
| 2003/0018107 A1 * | 1/2003 | Heinen | C08K 5/34928 524/100 |
| 2008/0033079 A1 * | 2/2008 | Costanzi | C08K 3/32 524/100 |
| 2013/0228728 A1 * | 9/2013 | Mathur | C08K 5/053 252/601 |

FOREIGN PATENT DOCUMENTS

| CN | 1926192 | 3/2007 | |
| CN | 101023126 | 8/2007 | |
| CN | 101903446 | 12/2010 | |
| WO | WO 2005/075566 | 8/2005 | |
| WO | WO 2006/029711 | 3/2006 | |
| WO | WO 2009/010812 | 1/2009 | |
| WO | 2009/086035 | 7/2009 | |
| WO | WO 2012113146 A1 * | 8/2012 | C01B 25/165 |

OTHER PUBLICATIONS

Papaspyrides (Chapter 1: Polymers on Fire: 5.3 Nitrogen-based flame retardants. Polymer Green Flame Retardants. 2011, 45 pages, particularly p. 22).*
BASF (Irganox 1098, BASF, 2010, 3 pages).*
International Search Report and Written Opinion for PCT/IB2011/002263, dated Apr. 11, 2012.
Written Opinion of the International Searching Authority for PCT/IB2011/002263, dated Apr. 11, 2012.
Written Opinion of the International Preliminary Examining Authority for PCT/IB2011/002263, dated Sep. 26, 2013.

* cited by examiner

*Primary Examiner* — Brieann R Johnston
(74) *Attorney, Agent, or Firm* — Silvia Salvadori

(57) ABSTRACT

The present invention relates to halogen-free flame retardant compositions essentially comprising polyamide polymers (preferred is polyamide 6), at least a hypophosporous acid metallic salt (preferred is aluminum hypophosphite), at least a nitrogen based flame retardant agent (preferably selected among melamine condensation products such as melam, melem, melon or their mixtures, and melamine cyanurate), at least an organic polyhydric compound and optionally further conventional components. Such compositions are highly flame retardant.

13 Claims, No Drawings

HALOGEN-FREE FLAME RETARDANT POLYAMIDES COMPOSITION

This application is the U.S. national phase of International Application No. PCT/IB2011/002263, filed 28 Sep. 2011, which designated the U.S., the entire content of which is hereby incorporated by reference.

BACKGROUND OF THE INVENTION

The chemical composition of organic polymers make them easily combustible. A wide variety of flame retardant additives are blend into plastics to achieve stringent standards demanded by processors and even by legislation.

Recently, despite the fact that halogen free flame retardant agents/additives (FR) represent, generally speaking, more expensive solutions compared to traditional brominated FR, some preference has been given to halogen free flame retardant additives because of environmental as well as for safety reasons. As a consequence, halogen free flame retardant (FR) agents are of increasing interest in the thermoplastic polymers market. Basic requirements for these products are good processing characteristics in compounding and moulding conditions, good mechanical and electrical properties in the solid state, no blooming or discoloration, good flame retardant properties in both reinforced and unreinforced polymers.

Particularly, flame retardant agents commonly used in Polyamides must satisfy stringent requirements concerning high processing temperatures, the absence of residual acidity that could cause polymer hydrolysis and the avoidance of blooming effects. These various requirements have limited the use of most of the known halogen free additives, apart from Red Phosphorus and Organic phosphinates.

Red phosphorus is the most effective flame retardant additive, especially for glass fiber reinforced polyamide, but its inherent red colour makes the corresponding polymer product difficult to be used for very light colours applications.

Organic phosphinates are a new family of halogen free flame retardant agents, particularly efficient in polyamides, especially when used in conjunction with a melamine containing product, the resulting mixture being more effective than organic phosphinates alone. These products, with particular regard to zinc and especially aluminium diethyl phosphinate, are currently commercially available under the "Exolit OP" brand.

This family of organic phosphinates was firstly described as flame retardant agents for example in EP 699708 and EP 6568.

Different processes for the preparation of Organic phosphinates were described, for instance in: CA 2641112, U.S. Pat. No. 6,300,516, U.S. Pat. No. 5,973,194, U.S. Pat. No. 6,011,72, DE 19910232, U.S. Pat. No. 6,090,968, EP 1016623, U.S. Pat. No. 6,329,544, U.S. Pat. No. 6,355,832, U.S. Pat. No. 6,359,171, U.S. Pat. No. 6,278,012, US 2003073865, US 2002079480, US 2006074157, US 2005137418.

Despite Organic phosphinates are satisfactory in terms of overall performances in polyamides, however, there is still a need for simpler molecules that could be produced in an easier and less expensive way.

Hypophosphorus acid metal salts, also called inorganic Phosphinates or Hypophosphites (phosphorus valence state=+1) have been reported as effective halogen free flame retardant additives for polymers.

Hypophosphites have the following chemical formula:

where:

"n" is an integer number ranging from 1 to 4 in dependence of the valence of the metal Me. The metal is any atom belonging to the groups I, II, III and IV of the periodic table of the elements.

Sodium and calcium Hypophosphites are currently widely commercially available and they are normally produced by reacting the corresponding metal hydroxide on yellow phosphorus, for instance according to the following reaction scheme:

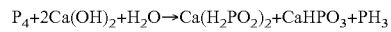

Hypophosphites of metals other than Calcium and Sodium are normally produced through the hypophosphorus acid reaction on the metal hydroxide or by exchange reaction with the corresponding soluble metal salts (see for instance "Hypophosphorus Acid and its salts", *Russian Chemical Review*, 44 (12), 1975).

Hypophosphites are a simpler molecules compared to organic phosphinates and are also easier to be produced. In addition, hypophosphites may be also used as starting raw material for subsequent organic phosphinates production.

Thermoplastic polyamides moulding materials containing Hypophosphites as flame retardant agents, were described in the art, see for instance WO 09/010812 and WO 2005/075566.

According to WO 2005/075566, a polyamide is made flame retardant by the addition of at least Aluminium Hypophosphite in the range of 1% to 30% by weight.

In all the conditions described in the previous art however, Hypophosphites result in lower flammability performances compared to organic phosphinates when tested on Polyamide 6. Particularly, no V0 rating according to UL-94 is achieved when the thickness of the speciment is lower than about 1 mm on Polyamide 6. This lack of flame retardant performances has been a strong barrier to the full development of flame retardant compounds based on Hypophosphites when used in combination with polyamides. There is therefore a strong need for highly performing flame retardant products, based on polyamide polymers and Hypophosphites.

OBJECT OF THE INVENTION

Object of the present invention is to provide halogen-free highly flame retardant polyamides, unreinforced or reinforced, based on hypophosphites.

In the purpose of present invention highly flame retardant means V0 classification on thin items according to international standard UL-94.

Thin items means thickness preferably lower than about 1 mm, and more preferably equal to 0.8 mm or even lower.

Another object of present invention is to provide halogen free flame retardant polyamides with high Glow Wire resistance, particularly passing the GWIT test at 775° C., according to IEC 61335-1.

Another object of present invention is to provide halogen free flame retardant moulding compositions and articles based on polyamides with good electrical properties, mechanicals and weathering resistance.

DESCRIPTION OF THE INVENTION

These and other objects according to the present invention are achieved by a polymer composition comprising:

a) at least a thermoplastic polyamide polymer, b) at least an Hypophosphorus acid metal salt, also called inorganic Phosphinate or Hypophosphite, where phosphorus valence state is equal to +1, as a first flame retardant (FR) component
c) at least a nitrogen based flame retardant agent, as a second flame retardant (FR) component
d) at least an organic polyhydric additive, as a third flame retardant (FR) component
e) other conventional additives.

Always according to the present invention, the above composition may additionally include:
f) fillers and for reinforcing fibers.

A preferred embodiment according to the present invention, is a composition consisting of components a) to e) where the total percentage of components a) to e) must be 100%.

Another preferred embodiment, always according to the present invention, is a composition consisting of components a) to f) where the total percentage of components a) to f) must be 100%.

Particularly, according to the present invention, said conventional additives are selected among: processing aids, heat and process stabilizers, UV stabilizers, antidripping agents, pigments, dispersing agents, mould release additives, nucleating agents, partially crosslinked elastic polymers, and their mixtures. More particularly, said preferred antidripping agents are PTFE (polytetrafluorethylene).

Always according to the present invention, said thermoplastic polyamide polymer is polyamide 6.

Said first flame retardant (FR) component is selected as Aluminium Hypophosphite. According to the invention, said second flame retardant (FR) component is selected among those currently commercially available under commercial names Melam, Melon, Melem or their mixtures, or Melamine cyanurate.

Said third flame retardant (FR) component is preferably selected as Pentaerythritol, Dipentaerythritol, Polypentaerythritol or their mixtures.

The flame retardant (FR) agents total content, is preferably lower than 35% and more preferably lower than 30%, so that mechanicals and electrical properties are satisfactory with respect to most of the desired applications.

Further aspects of the present invention, are described here below in more details.

a) Thermoplastic Polyamide Polymer

According to present invention, polyamide polymers are selected among:
1) Polyamide prepared by polycondensation reaction of saturated dicarboxylic acid having from 6 to 12 carbon atoms, with a saturated aliphatic primary diamine having from 6 to 12 carbon atoms;
2) Polyamino acids prepared either by a direct polycondensation reaction of an omega amino-alkanoic acid and containing a hydrocarbon chain having from 4 to 12 carbon atoms or by hydrolytic ring opening and polymerization of lactams derived from such acids;
3) Co-polyamides prepared from the starting monomers of the above mentioned polyamides provided that the acid component of said copolyamides may partially comprise terephtalic acid and/or isophtalic acid;
4) Mixtures of such polyamides.

Examples of polyamides prepared by polycondensation reaction of diacids and diamines, according to above point 1), include:
Nylon 6,6 (polymer of hexamethylene diamine and adipic acid)
Nylon 6,9 (polymer of hexamethylene diamine and azelaic acid)
Nylon 6,12 (polymer of hexamethylene diamine and dodecanoic acid)

Examples of other polyamides include:
Nylon 4 (polymer of 4-amino butanoic acid or gamma butyro lactam)
Nylon 6 (polymer of epsilon caprolactam)
Nylon 8 (polymer of caprylactam)
Nylon 1010
Nylon 12 (polymer of laurylactam)
Nylon 610

Some useful polyamides according to the present invention may be completely or partially based on renewably sources monomers. For example Nylon 1010 may contain 100% of renewably sourced content while Nylon 610 may contain 63%. The renewable content may come from sebacic acid which is derived from castor oil.

Examples of copolyamides, according to above mentioned point 3), include Nylon 6/6,6 (copolymer of hexamethylene diamine, adipic acid and caprolactam); Nylon 6,6/6,10 (copolymer of hexamethylene diamine, adipic acid and sabacoil acid).

Preferred polyamides to be flame retarded according to present invention are Polyamide (Nylon) 6 and polyamides with lower melting point than polyamide 6 (i.e. a melting point of about 220° C.). A sharp melting point is common to all nylon homopolymers, while some copolymers are characterized by broader melting points.

Examples of preferred polyamides to be flame retarded according to present invention are:
Polyamide (Nylon) 6
Polyamide (Nylon) 6,10
Polyamide (Nylon) 6,11
Polyamide (Nylon) 1010
Polyamide (Nylon) 11
Polyamide (Nylon) 12
Polyamide (Nylon) 6,12 b) Hypophosphites Also Called Hypophosphorus Acid Metal Salt, Also Called Inorganic Phosphinate The selection of the most appropriate Hypophosphite is subjected to a number of critical factors. Particularly, suitable hypophosphites must have sufficient thermal stability to overcome melt processing at temperature higher than around 200° C. If they do form hydrates, they must be used in the corresponding anhydrous form and they must not be hygroscopic when successively exposed to ambient humidity. Examples of such Hypophosphites are Aluminum hypophosphite (CAS 7784-22-7), Calcium hypophosphite (CAS 7789-79-9), Manganese hypophosphite (10043-84-2), Magnesium hypophosphite (CAS 10377-57-8), Zinc hypophosphite (CAS 15060-64-7), Barium hypophosphite (CAS 171258-64-3). Most preferred according to the present invention are Aluminum and Calcium Hypophosphites.

Aluminum hypophosphite, corresponding to chemical formula $Al(H_2PO_2)_3$, is currently produced by Italmatch Chemicals Spa (under commercial name "Phoslite IP-A") in a white powder form with a low humidity level, high purity and different PSD suitable for thermoplastic processing.

Calcium hypophosphite, corresponding to chemical formula $Ca(H_2PO_2)_2$, is also currently produced by Italmatch Chemicals Spa (under commercial name "Phoslite IP-C") This compound shows lower flame retardant performances in polyamides when compared to Aluminum hypophosphite. However, it can be advantageously used in those applications where thermal resistance of Aluminum hypophosphite would be critical. Aluminum and Calcium hypophosphites, being flammable powders as most of anhydrous hypophosphites, are often commercialized as a dry blend powder with other solid flame retardant agents or even in masterbatch form, for easier transport and manipulation.

c) Nitrogen Based Flame Retardant Agent

The selection of Nitrogen base flame retardant is also subjected to a number of critical factors. Particularly, suitable Nitrogen based flame retardant agents must have sufficient thermal stability to overcome melt processing at temperature higher than around 200° C. In addition, they must be characterized by a high Nitrogen content, for example higher than 40%, (indicated by nitrogen atom percentage with respect to 100% of the nitrogen containing compound).

For example, in case of melamine cyanurate, the Nitrogen content is about 49% on 100% of melamine cyanurate.

Molecular mass (molecular weight) is the mass of one molecule of a substance and is expressed in the unified atomic mass units (u). (1 u is equal to $^1/_{12}$ the mass of one atom of carbon-12), while Molar mass (molar weight) is the mass of one mole of a substance and is expressed in g/mol.

They also must be compatible with all the other components of the flame retardant composition, i.e. for example, Hypophosphites and organic polyhydric components. Moreover, they should not migrate to surface when they are incorporated into the polymer matrix, and it must be possible to grind them to fine PSD (Particle Size Distribution) suitable for thermoplastic processing, and they should not give rise to decomposition and/or discoloration after compounding.

For example, a commonly used flame retardant containing Nitrogen agent for polymers is Ammonium Polyphosphate ($NH_4PO_3$), Despite Ammonium Polyphosphate is sufficient thermally stable as such, it gives reaction and decomposition when put in contact with Hypophosphites (see Comparative Example C. 15). For the above reasons, Ammonium Polyphosphate as a source of Nitrogen, is out of the scope of present invention, being not compatible with Hypophosphites.

Preferred Nitrogen based flame retardant agents according to the present invention, include triazine derivatives, complexes and condensation products, with high Nitrogen content. Triazine is the chemical species of six-membered heterocyclic ring compound with three Nitrogens replacing carbon-hydrogen units in the benzene ring structure.

Preferred triazine derivatives within the scope of the present invention are derivatives of symmetric triazines. A review on derivative of symmetric triazine is given in "Recent applications of 2,4,6-trichloro-1,3,5-triazine and its derivatives in organic synthesis, Tetraedron 62/2006, 9597 9522".

Particularly preferred are derivative of Melamine (1,3,5-Triazine-2,4,6-triamine, or 2,4,6-Triamino-s-triazine).

According to the present invention, most preferred Nitrogen based flame retardant agents are condensation products of Melamine, like the those currently commercially available as Melam (CAS 3576-88-3), Melem (CAS 1502-47-2), Melon (CAS 32518-77-7). Melam, Melem, Melon, pure or in mixtures, are also preferred options. Melam Nitrogen content is about 65%.

Melamine cyanurate is also a preferred option, according to the invention. Melamine cyanurate, chemical formula $C_6H_9N_9O_3$, is a complex of Melamine and Cyanuric acid that contains high Nitrogen content, about 49%.

Phosphoric acid Melamine salts or adduct like Melamine Phosphate, Pyrophosphate or Polyphosphate are out of the scope of the invention, giving reactions and decomposition when put in contact with Hypophosphites (see Comparative Example C. 12). Melamine phosphate and pyrophosphate are not thermally stable to be processed into thermoplastic polyamides, evolving water at temperatures lower than about 200° C.

d) Organic Polyhydric Additive

An organic polyhydric additive may be defined as an organic molecule containing many hydroxyl (—OH) radicals, not linked to aromatic or coniugated unsatured bonds. For example, $Mg(OH)_2$ does not belong to organic polyhydric additives definition, despite the fact that hydroxyl groups are present, because it is an inorganic compound. Also phenol-formaldehyde resins do not belong to organic polyhydric additives definition, because in this case, hydroxyl group is linked to benzene. On the other hand, a polyalcohol (or polyol) like glycerol, $C_3H_5(OH)_3$, is an example of organic polyhydric additive. Sugar alcohol are also a class of polyalcohol, and they are an example of organic polyhydric additive.

A preferred organic polyhydric additive according to the invention is pentaerythritol, chemical formula $C_5H_{12}O_4$, with —OH content=49.9% by weight, and also blends of pentaerythritol, dipentaerythritol which are currently widely commercially available, and mixtures in any proportion.

Organic polyhydric additives may be also selected among polyhydric polymers (also called polymeric polyalcohol or polymeric polyol).

Polyhydric polymers may be produced starting from by monomeric polyols such pentaerythritol (in this latter case, obtaining Polypentaerythritol), ethylene glycol and glycerin (in this latter case, obtaining Polyglycerol).

Polyglycerol synthesis has been described for instance in U.S. Pat. No. 2,487,208, U.S. Pat. No. 3,968,169, U.S. Pat. No. 4,551,561, U.S. Pat. No. 5,710,350, WO9516723, WO9521210, U.S. Pat. No. 5,635,588, US2010/0240929.

Polypentaerythritol synthesis has been described for instance in U.S. Pat. No. 2,462,049 and U.S. Pat. No. 2,552,532.

Polypentaerythritol as currently commercially available is often mixtures of di-, tri-, tetra-, pentaerythritol and may contain also small percentage of other polyols.

A preferred polyhydric polymer currently commercially available is Charmor® PP100 (Perstorp).

Organic polyhydric additive may be selected also among starch or other carbohydrates.

Another organic polyhydric additive within the scope of present invention is Trishydroxyethylisocianurate, chemical formula $C_9H_{15}N_3O_6$. Other Polyhydric additives suitable to be used according to the present invention are those obtained by reaction between Trishydroxyethylisocianurate with aromatic diacids as terephtalic acid, are described in U.S. Pat. No. 5,326,805. They show lower volatility and lower water solubility compare to pure Trishydroxyethylisocianurate.

The selection of the most suitable organic polyhydric additives is subjected to a number of critical factors. Particularly, suitable organic polyhydric additives must have sufficient thermal stability to overcome melt processing at temperature higher than around 200° C.

Moreover, they should have a relatively low water solubility, they should not migrate to surface or sublimate when incorporated into the polymer matrix, they should be meltable at processing temperature or available in a suitable PSD for thermoplastic incorporation and they do not give rise to odor or discoloration after compounding.

e) Fillers and/or Reinforcing Fibers

Examples of preferred reinforcing fibers are carbon fibers, aramid fibers and preferably glass fibers to be used in the commercially available form of chopped glass. In order to improve compatibility with thermoplastic resins, the reinforcing fiber may have been surface treated with a silane compound. Reinforcing fibers are used in the range from 10% to 50%, preferably from 20% to 35% by weight on the weight of the resin: if the amount of reinforcing fiber is lower than 10%, no advantage is observed in the mechanical properties of the final product, while if the amount is higher than 50% by weight, viscosity of the melt is found too high.

Example of fillers are glass beads, hollow glass spheres, amorphous silica, chalk, mica, calcinated kaolin, wollastonite, talc, magnesium carbonate, barium sulphate or similar products. They also may have been surface treated with fatty acids or the like, or may have been milled in the presence of fatty acids or the like. Any particulate substance currently available in the market as filler for thermoplastic resins, may be used in the compositions according to the present invention, provided that the average particle size of the powder, when measured by laser instrument, is in the range of about 2 microns to 20 microns.

f) Other Conventional Additives

Novel thermoplastic compositions may also contain one or more of the following compounds: processing aids, heat and process stabilizers, UV stabilizers, antidripping agents, pigments, dispersing agents, mould release additives, nucleating agents, partially crosslinked elastic polymers used as impact modifiers, and their mixtures. An example of antidripping agent is PTFE (polytetrafluorethylene).

Experimental Part

In the following examples, the below listed components were used:

Polymers:
Polyammide 6 (currently commercially available as Latamid 6, by Lati), hereafter "PA6"
Reinforcing agents:
Glass fiber (PPG3786, by PPG), hereafter "OF"
Lubricants:
Ethylene Bis Stearamide (by Sinochem), hereafter "EBS"
Stabilizers:
Hindered phenol heat stabilizer (Irganox 1098, by Ciba), hereafter "Irg. 1098" Phosphite process stabiliser (Irgaphos 168, by Ciba), hereafter "Irg. 168"
Hypophosphite:
Aluminium hypophosphite (Phoslite IP-A, by Italmatch Chemicals), hereafter "IP-A"
FR synergists:
Melamine cyanurate (Melagard MC25, by Italmatch Chemicals), hereafter "MC"
Pentaerythritol (Pentaerythritol, by Sigma Aldrich), hereafter "PERT"
Trihydroxyethyl isocianurate (Trihydroxyethyl isocianurate, by Sigma Aldrich), hereafter "THEIC"
Di pentaerytritol (Charmor DP40, Perstorp), hereafter "DI-PERT"
Polyhydric Polymer (Charmor PP100, Perstorp), hereafter "POLY-POLY"
Melon/Melem mixture (Delacal 420, by Delamin), hereafter "DEL"
FR for comparative examples:
Melamine polyphosphate (Melapur 200/70, by BASF), hereafter "MPP"
Melamine-poly (zinc phosphate) (Safire 400, Catena), SAF400
Melamine-poly (aluminium phosphate) (Safire 400, Catena), SAF200
Ammonium polyphosphate (Exolit AP 422, by Clariant), hereafter "APP"

Examples According to the Invention (Ex. 1 to Ex. 7) and Comparative Examples (C.8 to C.15)

All components reported in table 1 are compounded in a 20 mm twin screw extruded with a temperature profile in the range 250-270° C. The polymer is dried 1 night in an oven at 120° C. before extruding. After a second drying of the compound in the same conditions, pellets were injection moulded at different thickness, and 5 specimens were conditioned for 24 hours at 23° C. and 50% humidity. Flammability have been reported according to UL-94 procedure. When tests do not meet V0, V1 and V2 an NC classification has been given, when it was not possible to extrude or to inject samples an ND classification was attributed.

TABLE 1

| | Ex. 1 | Ex. 2 | Ex. 3 | Ex. 4 | Ex. 5 | Ex. 6 | Ex. 7 | C. 8 |
|---|---|---|---|---|---|---|---|---|
| PA 6 | 53.3% | 53.3% | 53.3% | 53.3% | 53.3% | 53.3% | 53.3% | 53.3% |
| IP-A | 13% | 13% | 13% | 13% | 11.5% | 13% | 13% | 21% |
| MC | 6% | 6% | — | — | 6.5% | 4% | 4% | — |
| DEL | — | — | 6% | 6% | — | — | — | — |
| PERT | 2% | — | 2% | — | 3% | — | — | — |
| THEIC | — | 2% | — | 2% | — | — | — | — |
| DI-PERT | — | — | — | — | — | 4% | — | — |
| POLY-POLY | — | — | — | — | — | — | 4% | — |
| MPP, or SAF 400, or SAF 200 | — | — | — | — | — | — | — | — |
| APP | — | — | — | — | — | — | — | — |
| GF | 25% | 25% | 25% | 25% | 25% | 25% | 25% | 25% |
| EBS | 0.3% | 0.3% | 0.3% | 0.3% | 0.3% | 0.3% | 0.3% | 0.3% |
| Irg.1098 | 0.3% | 0.3% | 0.3% | 0.3% | 0.3% | 0.3% | 0.3% | 0.3% |
| Irg.168 | 0.1% | 0.1% | 0.1% | 0.1% | 0.1% | 0.1% | 0.1% | 0.1% |
| UL-94 | | | | | | | | |
| 1.6 mm | V0 | V0 | V0 | V0 | V0 | V0 | V0 | V0 |
| 0.8 mm | V0 | V0 | V0 | V0 | V0 | V0 | V0 | V2 |

| | C. 9 | C. 10 | C. 11 | C. 12 | C. 13 | C. 14 | C. 15 |
|---|---|---|---|---|---|---|---|

TABLE 1-continued

| | | | | | | | |
|---|---|---|---|---|---|---|---|
| PA 6 | 44.3% | 53.3% | 44.3% | 53.3% | 44.3% | 53.3% | 53.3% |
| IP-A | 30% | 10.5% | 15% | 10.5% | 15% | 10.5% | 10.5% |
| MC | — | 10.5% | 15% | — | — | — | — |
| DEL | — | — | — | 10.5% | 15% | — | — |
| PERT | — | — | — | — | — | — | — |
| THEIC | — | — | — | — | — | — | — |
| DI-PERT | — | — | — | — | — | — | — |
| POLY-POLY | — | — | — | — | — | — | — |
| MPP, or SAF 400, or SAF 200 | — | — | — | — | — | 10.5% | — |
| APP | — | — | — | — | — | — | 10.5% |
| GF | 25% | 25% | 25% | 25% | 25% | 25% | 25% |
| EBS | 0.3% | 0.3% | 0.3% | 0.3% | 0.3% | 0.3% | 0.3% |
| Irg.1098 | 0.3% | 0.3% | 0.3% | 0.3% | 0.3% | 0.3% | 0.3% |
| Irg.168 | 0.1% | 0.1% | 0.1% | 0.1% | 0.1% | 0.1% | 0.1% |
| UL-94 | | | | | | | |
| 1.6 mm | V0 | NC | V1 | V0 | V0 | ND | ND |
| 0.8 mm | V2 | NC | NC | NC | NC | ND | ND |

Comments to Examples Ex. 1,2,3,4,5,6,7 According to the Invention and to Comparative Examples C. 8,9,10,11,12,13 as Reported in Table 1

Ex. 1,2,3,4,5,6,7 show how combinations according to present inventions of Aluminium hypophosphite, melamine cyanurate or melamine condensation products, and organic polyhydric compounds do impart UL-94 V0 classification at 0.8 mm on PA6 glass fibre reinforced at a total flame retardant loading level of 21% by weight. On the other hand, counter examples C. 8,9,10,11,12,13, not according to the invention, containing combinations of Hypophosphite and Nitrogen containing compound only, show lower flammability performances with respect to the compounds obtained according to the present invention, even at high loading. Counter Examples C. 8,9,10,11,12,13 are realized according to the previous art.

Even at a 30% by weight total loading, Aluminium hypophosphite alone as flame retardant agent (see comparative example C. 9 not according to the invention) do not reach UL-94 V0 at 0.8 mm. Combinations of Aluminium hypophosphite and Nitrogen containing compounds (see comparative examples C. 10, C. 11, C. 12, C. 13) do not improve UL-94 compared to Aluminium Hypophosphite alone.

Comments to Comparative Examples C. 14 and C. 15 not According to the Present Invention, Reported in Table 1

Compositions according to comparative examples C. 14 and C. 15 were very difficult to extrude, giving broken strands, smoke and decomposition by products. Compositions according to C. 14 and C.15 were not possible to inject mould, giving violent decomposition with flames and fire. This Counter examples not according to the invention, show how polyphosphate salts cannot be used in combinations with Hypophosphites in polyamide extrusion and injection molding.

The invention claimed is:
1. A halogen free flame retardant polyamide thermoplastic composition consisting of:
 a) at least a thermoplastic polyamide polymer,
 b) at least a hypophosphorus acid metal salt, where phosphorus valence state is equal to +1, as a first flame retardant (FR) component,
 c) at least a nitrogen based flame retardant agent, as a second flame retardant (FR) component, said second FR component being melam or melem or a mixture thereof,
 d) at least an organic polyhydric additive, as a third flame retardant (FR) component, selected from the group consisting of pentaerythritol, dipentaerythritol, poly-pentaerythritol, and their mixtures,
 e) conventional additives selected from the group consisting of: processing aids, process stabilizers, UV stabilizers, antidripping agents, pigments, dispersing agents, mould release additives, nucleating agents, partially crosslinked elastic polymers used as impact modifiers, and their mixtures;
 f) a hindered phenol heat stabilizer; and
 g) fillers and/or reinforcing fibers,
 wherein said halogen free flame retardant polyamide thermoplastic composition reaches UL-94 classification V0 at 0.8 mm and is free of halogens.
2. The polyamide composition according to claim 1, wherein the composition consists of components a) to g) where the total percentage of components a) to g) equals 100%.
3. The polyamide thermoplastic composition according to claim 1, wherein said polyamide is polyamide 6.
4. The polyamide thermoplastic composition according to claim 1, wherein said polyamide is glass reinforced.
5. The polyamide thermoplastic composition according to claim 4, wherein said polyamide is polyamide 6.
6. The polyamide thermoplastic composition according to claim 1, wherein said polyamide is selected from the group consisting of polyamide 6,10, polyamide 6,11, polyamide 10, polyamide 11, polyamide 12, polyamide 6,12, and their mixtures.
7. The polyamide thermoplastic composition according to claim 1, wherein said first flame retardant (FR) component is aluminum hypophosphite.
8. The polyamide thermoplastic composition according to claim 1, wherein flame retardant (FR) agents total content, is lower than 35% by weight on the total weight of the composition.
9. The polyamide thermoplastic composition according to claim 8, wherein said flame retardant (FR) agents total content is lower than 30% by weight on the total weight of the composition.
10. The polyamide thermoplastic composition according to claim 1, wherein the composition includes:

from 5% to 20% by weight of aluminum hypophosphite, and from 1% to 6% by weight of said organic polyhydric additive.

11. The polyamide thermoplastic composition according to claim 1, wherein the composition includes:

from 5% to 20% by weight of aluminum hypophosphite, and from 1% to 6% by weight of said organic polyhydric additive.

12. The polyamide thermoplastic composition according to claim 1, wherein said conventional additives comprise PTFE (polytetrafluorethylene) as an antidripping agent.

13. The polyamide thermoplastic composition according to claim 1, wherein said fillers comprise one of glass beads, hollow glass spheres, amorphous silica, chalk, mica calcinated kaolin, wollastonite, magnesium carbonate, and barium sulphate.

\* \* \* \* \*